United States Patent
Oda

Patent Number: 5,551,077
Date of Patent: Aug. 27, 1996

[54] PORTABLE TELEPHONE EQUIPMENT WITH CONDITION RESTORATION

[75] Inventor: Tateru Oda, Hyogo-ken, Japan

[73] Assignee: Mitsubishi Denki Kabushiki Kaisha, Tokyo, Japan

[21] Appl. No.: 181,110

[22] Filed: Jan. 14, 1994

[30] Foreign Application Priority Data

Jan. 20, 1993 [JP] Japan .................................. 5-024777

[51] Int. Cl.⁶ ...................................................... H04B 1/16
[52] U.S. Cl. ........................ 455/343; 455/38.2; 455/38.3; 379/58
[58] Field of Search ................................... 455/343, 38.3, 455/38.2, 127, 115, 117; 379/58, 63

[56] References Cited

U.S. PATENT DOCUMENTS

| | | |
|---|---|---|
| 4,509,201 | 4/1985 | Sekigawa et al. .................... 455/73 |
| 4,903,327 | 2/1990 | Raghuram et al. .................... 455/127 |
| 5,036,532 | 7/1991 | Metroka et al. ...................... 379/58 |
| 5,222,245 | 6/1993 | Ando et al. .......................... 455/13.2 |

FOREIGN PATENT DOCUMENTS

| | | |
|---|---|---|
| 0280501 | 8/1988 | European Pat. Off. . |
| 2240010 | 7/1991 | United Kingdom . |
| 9102424 | 2/1991 | WIPO . |

*Primary Examiner*—Reinhard J. Eisenzopf
*Assistant Examiner*—Lee Nguyen
*Attorney, Agent, or Firm*—Rothwell, Figg, Ernst & Kurz

[57] ABSTRACT

After recovery from a power failure in a main power source, if it is a short break, recovery time is obtained from a built-in clock and the period of the short break is calculated from this recovery time and the time when the short break occurred. If the of period of the short break falls within a resumption allowable time range, a resuming function is effected by setting information on the pre-break operation state of the equipment prestored in a memory so that the equipment can continue operation.

2 Claims, 3 Drawing Sheets

PORTABLE TELEPHONE EQUIPMENT WITH CONDITION RESTORATION

BACKGROUND OF THE INVENTION

1. Field of the Invention

The present invention relates to a portable telephone equipment, and, more particularly, to a resuming function to return the portable telephone equipment which is interrupted by a short break in power supply to the state before the short break.

2. Description of the Prior Art

Some portable telephones of the prior art resume their pre-break states when a short break in power supply occurs if the period of the break is shorter than the discharge time of a capacitor incorporated in the hardware. This is because the capacitor which is charged during normal operation continues to discharge according to the time constant of a circuit during a short break caused by battery exchange or the like. When the equipment recovers from a short break, if the terminal voltage of this capacitor is still higher than the threshold value, a power failure is determined as a short-time break. In this case, the equipment resumes its communication state, for example, based on prestored information on the pre-break operation state of the equipment. It is supposed that power supply to the above-described prior art equipment is cut temporarily because of battery exchange or the like during operation. At this time, information on the operation state of the equipment is prestored in a memory to prevent it from being lost by short breaks. In addition, during normal operation, a capacitor for determining the period of a short break is charged. The capacitor begins to discharge when there is a short break in power supply, and the terminal voltage thereof begins to fall according to a predetermined time constant of a circuit. When the equipment recovers from the short break, the terminal voltage of the capacitor is checked during the activation of the portable telephone equipment. If the voltage is beyond a threshold value, a power failure is determined as a short-time break, and the equipment is caused to resume the pre-break operation state by setting radio part based on prestored information on the pre-break operation state of the equipment.

Owing to the above function, a time-constant circuit corresponding to a set time for allowing resumption is prepared to determine the period of a short break so that the equipment can continue the same operation before and after the break if the period is short.

The term "the set time for allowing resumption" means the time set in the portable telephone equipment to determine whether a power failure is a short break or not for resumption. The time required for a fixed station controlling a portable telephone equipment to determine the abnormal completion of communication is several seconds, but is not always constant. In consequence, unless the above-mentioned set time is set at a time shorter than the decision time, that is, within a time range that the fixed station allows resumption, the equipment will not operate properly, thus exerting an adverse effect on the telephone system.

To effect the resuming function in the prior art portable telephone equipment, whether the period of a short break falls within a resumption allowable time range or not is determined indirectly from the discharge voltage of a capacitor. Therefore, the allowable time range (resumption time) cannot be set precisely because Of the wide margins of error caused by differences in produced capacitors and fluctuations in the time constant of the circuit by temperature. As far as the allowable time range permits, it is desirable that the resumption set time is set as long as possible. In fact, the actual set time may become shorter than desired, and, accordingly, it is difficult to set a long allowable time range (resumption time).

SUMMARY OF THE INVENTION

The invention is intended to solve the above-described problems, and it is therefore an object of the invention to provide a portable telephone equipment which can continue its operation state (communication state, for example) without failure before and after a short break in power supply caused by battery exchange or the like by setting a long resumption time within a resumption allowable time range that does not affect the equipment.

The portable telephone equipment of the invention comprises an auxiliary power source 3, a power source switching controller 4 for detecting a power failure in a main power source 2 and switching from the main power source 2 to the auxiliary power source 3 during the power failure, storage means (memory 7) for storing information on the operation state of the equipment when a power failure in the main power source 2 occurs, a clock 6 for obtaining information on the time when a power failure in the main power source 2 occurs and time when the main power source 2 recovers, and a processor (CPU 5) for determining whether the above-mentioned power failure in the main power source 2 is a short break caused by battery exchange or the like, and further determining whether the period of the short break falls within a resumption allowable time range if the power failure is determined as a short break, and for resuming the equipment based on the above-mentioned information on the operation state if the period falls within the resumption allowable time range.

When a power failure in the main power source occurs, the power source is switched to the auxiliary power source so that the clock and the storage means can continue operation. In other words, during a power failure in the main power source, information on the operation state of the equipment at the time of the power failure in the main power source is stored in the storage means and kept during the power failure when the main power source recovers, this information is transferred to the processor which also receives from the clock the time when the power failure in the main power source occurred and the time when the main power source recovered. The processor determines that the power failure in the main power source is a short break and returns the equipment to the operation state before the power failure in the main power source based on the above-described information on the operation state of the equipment if the period of the short break falls within the resumption allowable time range.

The above and other objects, features and advantages of the invention will become more apparent from the following description when taken in conjunction with the accompanying drawings.

DESCRIPTION OF THE PREFERRED EMBODIMENT

Embodiment 1

Figure 1:
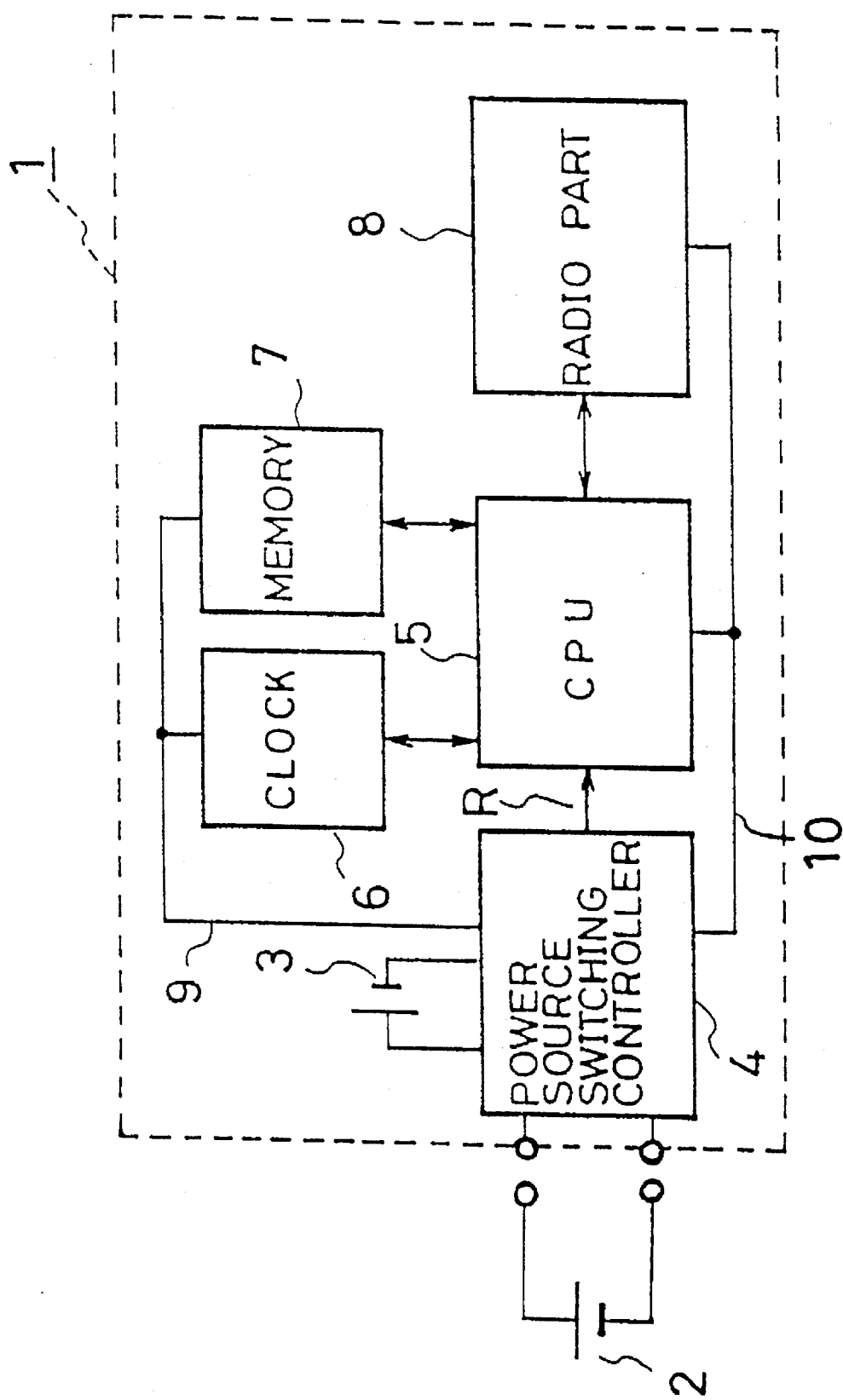
FIG. 1 is a block diagram showing the hardware configuration of a portable telephone equipment according to an embodiment of the present invention.
Figure 2:
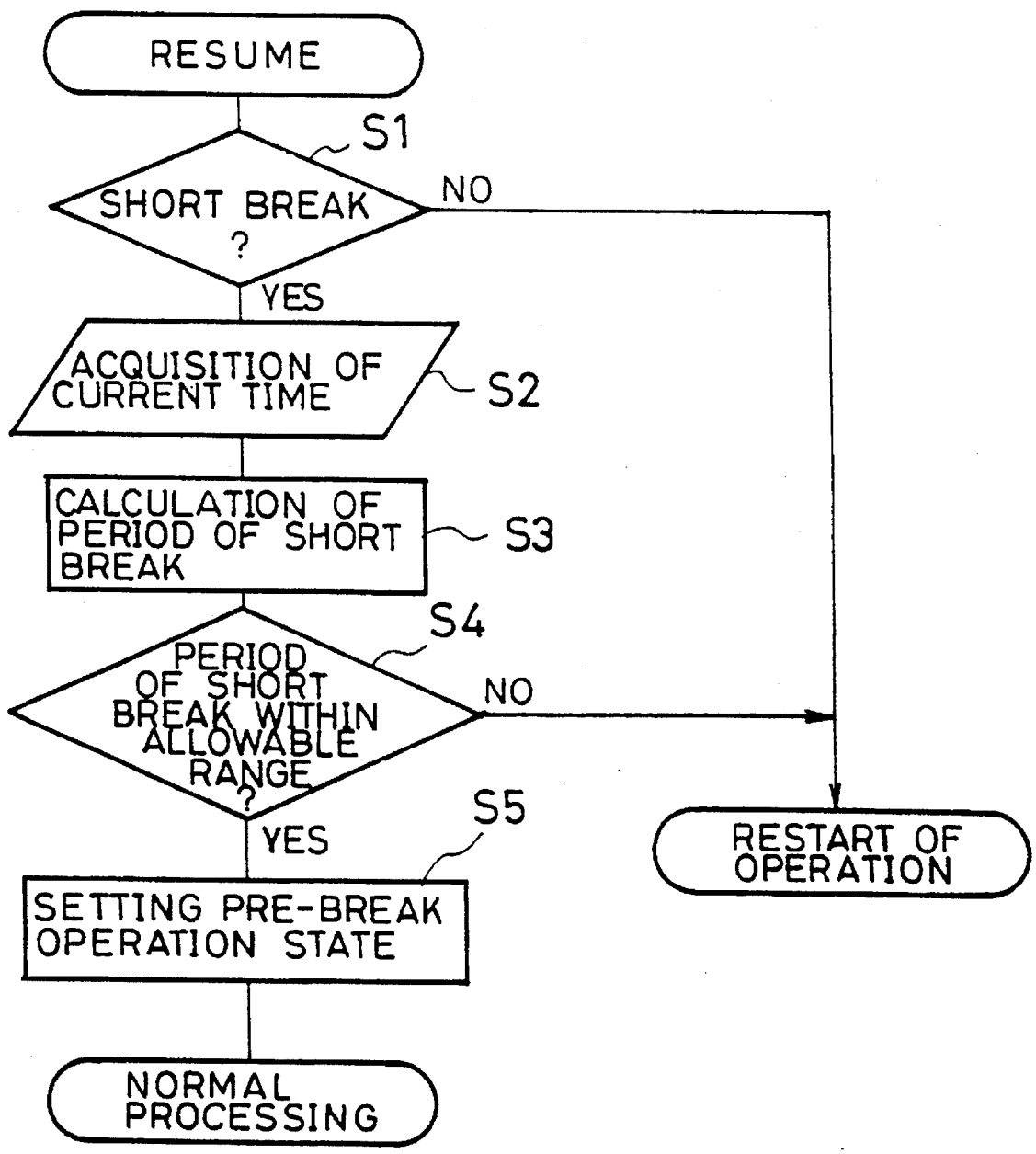
FIG. 2 is a flow chart showing software processing of the resuming function of the present invention.

FIG. 1 is a block diagram showing the hardware configuration of a portable telephone equipment according to an embodiment of the present invention. FIG. 2 is a flow chart of software for effecting the resuming function of the portable telephone equipment. In FIG. 1, reference numeral 1 represents the resuming function part of the portable telephone equipment, and 2 a main power source. Denoted at 3 is an auxiliary power source, 4 a power source switching controller, 5 a CPU, 6 a clock, 7 a memory (storage means), and 8 a radio part. Reference numeral 9 represent a power line for supplying power to the clock and the mere memory and 10 a main power source line. When the power source switching controller 4 detects a power failure in the main power source, power is supplied to the power line 9 from the auxiliary power source 3 during the power failure. Therefore, the clock 6 and the memory 7 are not initialized even when a power failure in the main power source occurs. Since a reset signal R is output from the power source switching controller 4 to the CPU 5 when the main power source recovers from the power failure, the process of FIG. 2 included in part of the start program is executed to continue the original operation by setting the operation state before a short break if the period of the short break falls within the resumption allowable time range.

A description is subsequently given of the operation of the portable telephone equipment.

Before the start of the resuming function, that is, during normal operation, current time and the operation state are stored and updated in the memory 7. When a power failure in the main power source occurs, all the parts except the clock 6 and the memory 7 to which power is supplied from the auxiliary power source 3 through the power line 9 are stopped during the power failure, the time when the power failure occurred and the operation state of the equipment are stored in the memory 7, and the software of FIG. 2 in the start program is executed by the resumption of the main power source. With this software, it is determined whether the equipment recovered from a temporary short break caused by battery exchange or the like and not by normal power ON/OFF operation in step S1. This decision is made in the following manner. During the normal operation of the portable telephone equipment, data for detecting a short break is prestored in the non-volatile RAM area of the memory 7, and cleared at the time of handling a power failure. Then, the above-described detection data is checked in a start-up process (executed at the time of both power ON operation and recovery from a power failure). At this time, when the detection data is not cleared and remains due to power supply from the auxiliary power source 3, resumption is determined as recovery from a short break and not from power ON/OFF operation. When the data is cleared, resumption is determined as power ON by normal power ON/OFF operation. If resumption is determined as recovery from a short break, the current time is obtained from the clock 6 as the recovery time from the short break in step S2. In the subsequent step S3, the time when the short break occurred and the recovery time are calculated for comparison in step S4, and whether the period of the short break falls within the resumption allowable time range is determined. If the period falls within the range, the step goes to S5 where the radio part 8 and others are set based on the information on the pre-break operation state stored in the memory 7 to effect the resumption of the equipment.

Embodiment 2

In the hardware configuration of the above-described Embodiment 1, when the clock 6 having a timing function is used, the same effect can be obtained by changing the software procedure slightly. At the time of normal operation, the counter having a timing function is first reset and begins to count time when a power failure in the main power source occurs. In response to this, the software is modified in such a way that the time of a short break can be obtained directly by changing the current time obtained from the clock 6 in step S2 to the counted time, thus eliminating the calculation of step S3 and accomplishing the same object as in Embodiment 1.

Embodiment 3

Figure 3:
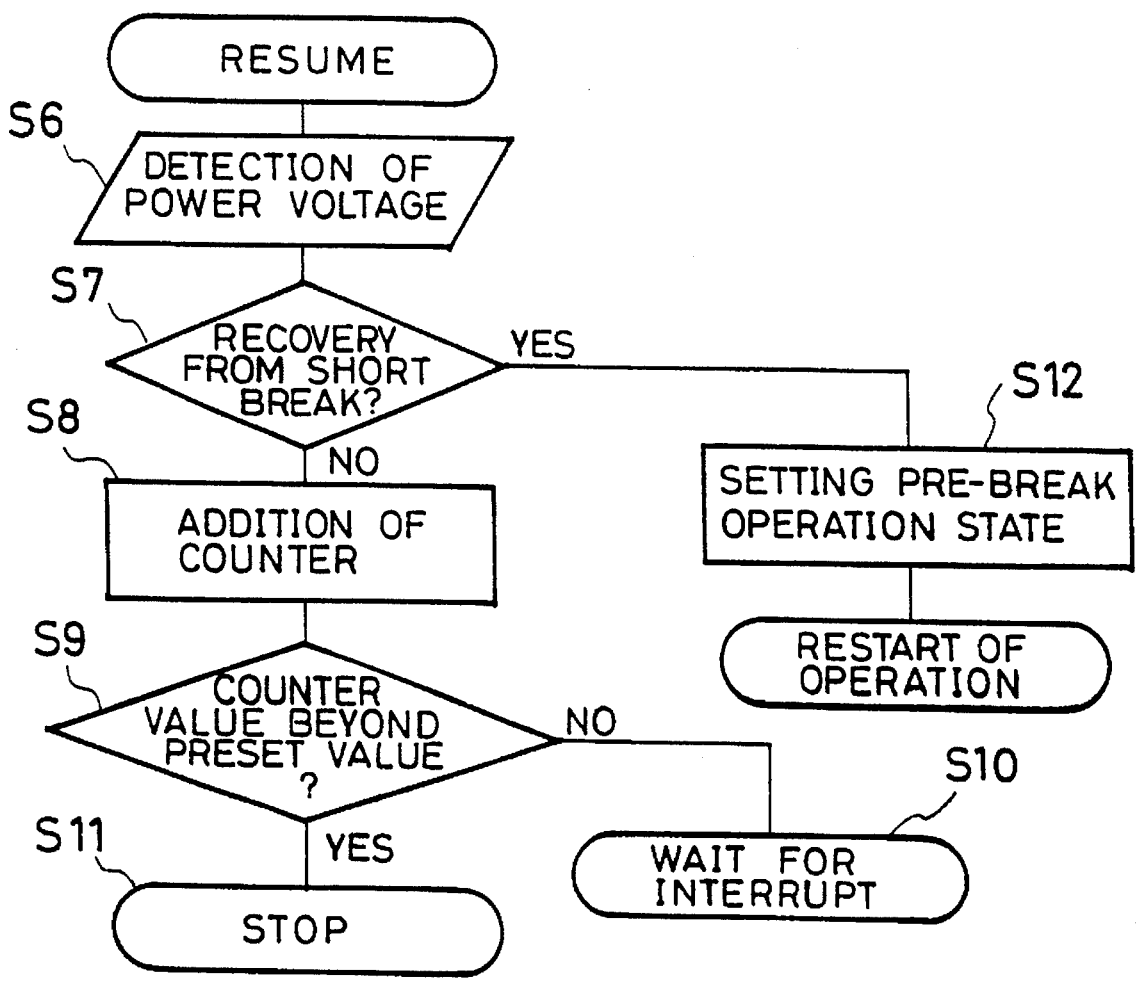
FIG. 3 is a flow chart showing the resuming function of another embodiment of the present invention.

In the hardware configuration of Embodiment 1, the operation of the CPU is maintained by the auxiliary power source 3 during a power failure in the main power source, and an interrupt request is generated by the clock 6 at fixed time intervals. It is programmed that an interrupt is prohibited during normal operation and permitted when a short break is detected from power voltage, in order to switch the equipment to a power saving state and to await an interrupt. (In this case, whether the equipment recovered from a short break or not is determined by checking power voltage after a power failure in the main power source occurred. If the power voltage is in an equipment operable voltage range, it is determined that the equipment recovered from the short break.) The processing of an interrupt is performed as follows. A power voltage is read as shown in FIG. 3 (step S6) to check whether the equipment recovered from a short break or not (step S7). When the equipment recovered from a short break, an interrupt is prohibited and resumption is performed by the process of step S12 described in FIG.3. During a short break, a value of the counter is added (step S8) and the step returns to an interrupt waiting step (S10). When the value of the counter exceeds a set value (step S9), it is determined that the equipment did not recover from a short break in an allowable time and the CPU 5 is turned off (step S11). With the above-described process, the same effect as in Embodiment 1 can be obtained.

As described on the foregoing pages, according to the present invention, since recovery from a short break is determined directly by using a clock to measure the period of a short break, a stable resumption allowable time is ensured without being affected by error caused by differences in produced constituent components and temperature variations. Furthermore, it is possible to set precisely a longer resumption time within a resumption allowable range. Therefore, according to the present invention, there is provided a portable telephone equipment which can continue its operation state without failure before and after a short break in power supply caused by battery exchange or the like.

What is claimed is:

1. A portable telephone equipment powered by a main power source and an auxiliary power source, said portable telephone equipment comprising:

a power source switching controller for detecting a power failure in said main power source and switching power supply to said auxiliary power source during the power failure;

storage means for storing information on the operation state of the equipment when a power failure in said main power source occurs;

a clock for obtaining information on the time when a power failure in said main power source occurs and for generating interrupt requests at fixed time intervals;

means for detecting restoration of said main power supply after the failure thereof;

means for storing in a counter the number of successive interrupt requests generated by said clock and for determining whether the stored number of interrupt requests is less than a preset number; and means for resuming operation of the equipment based on information stored in said storage means when said means for detecting restoration of said main power supply detects restoration of said main power supply after a failure thereof and when the number of interrupt requests stored in said counter is less than said preset number.

2. A portable telephone equipment as set forth in claim 1 further comprising means for preventing resumption of the operation of the equipment based on the information stored in said storage means when the number of interrupt requests stored in said counter exceeds said preset number.

* * * * *

UNITED STATES PATENT AND TRADEMARK OFFICE
CERTIFICATE OF CORRECTION

PATENT NO. : 5,551,077
DATED : August 27, 1996
INVENTOR(S) : Tateru Oda

It is certified that error appears in the above-indentified patent and that said Letters Patent is hereby corrected as shown below:

Col. 2, line 44, "failure when" should be
-- failure. When --; Col. 3, line 18, delete "mere".

Signed and Sealed this

Seventh Day of January, 1997

Attest:

BRUCE LEHMAN

*Attesting Officer*  *Commissioner of Patents and Trademarks*